United States Patent
Motoyoshi et al.

(10) Patent No.: US 12,362,611 B2
(45) Date of Patent: Jul. 15, 2025

(54) PERMANENT MAGNET SYNCHRONOUS MOTOR

(71) Applicant: Mitsubishi Electric Corporation, Tokyo (JP)

(72) Inventors: Kenta Motoyoshi, Tokyo (JP); Yuki Nishimura, Tokyo (JP); Yu Hirotani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 97 days.

(21) Appl. No.: 18/035,933

(22) PCT Filed: Nov. 25, 2020

(86) PCT No.: PCT/JP2020/043729
§ 371 (c)(1),
(2) Date: May 9, 2023

(87) PCT Pub. No.: WO2022/113181
PCT Pub. Date: Jun. 2, 2022

(65) Prior Publication Data
US 2024/0022125 A1  Jan. 18, 2024

(51) Int. Cl.
*H02K 1/2706* (2022.01)

(52) U.S. Cl.
CPC ................... *H02K 1/2706* (2013.01)

(58) Field of Classification Search
CPC .... H02K 1/278; H02K 1/2781; H02K 1/2783; H02K 1/2706; H02K 1/2753; H02K 21/14; H02K 2213/03; H02K 19/02
(Continued)

(56) References Cited

U.S. PATENT DOCUMENTS

2009/0134731 A1  5/2009  Okumoto et al.
2011/0241466 A1*  10/2011  Takahashi .............. H02K 1/278
310/156.01
(Continued)

FOREIGN PATENT DOCUMENTS

CN   110752690 A  *  2/2020
JP   2007-037322 A     2/2007
(Continued)

OTHER PUBLICATIONS

Machine Translation of CN_110752690_A (Year: 2020).*
(Continued)

*Primary Examiner* — Alexander A Singh
*Assistant Examiner* — Charlie Frank Mann, Jr.
(74) *Attorney, Agent, or Firm* — XSENSUS LLP

(57) ABSTRACT

A permanent magnet includes a recessed portion to fit therein with a protrusion provide in a rotor core; and, when the shortest distance between outmost part of the recessed portion and an outer periphery's circular arc portion of the magnet is defined as L1, and when the distance between the recessed portion and the outer periphery's circular arc portion is defined as L2 where the distance L2 passes through an intersection point at which a tangential line of outmost part on the recessed portion intersects with a parallel line, which defines as its start point a point from which a changeover to the recessed portion occurs from an adhesion surface between the magnet and the rotor core, and which is in parallel with a radial line extending from the rotor's shaft center toward the center of the magnet, the magnet includes the recessed portion that satisfies L2≥L1.

13 Claims, 12 Drawing Sheets

(58) Field of Classification Search
USPC .......................................................... 310/156
See application file for complete search history.

(56) References Cited

U.S. PATENT DOCUMENTS

| | | | | |
|---|---|---|---|---|
| 2012/0194024 A1* | 8/2012 | Okada | ...................... | H02K 1/28 |
| | | | | 310/156.01 |
| 2015/0162789 A1 | 6/2015 | Tanaka et al. | | |
| 2017/0127694 A1 | 5/2017 | Manrique et al. | | |

FOREIGN PATENT DOCUMENTS

| | | | | | |
|---|---|---|---|---|---|
| JP | 2009-131070 | A | 6/2009 | | |
| JP | 2011-045156 | A | 3/2011 | | |
| JP | 2011-211819 | A | 10/2011 | | |
| JP | 2012-249354 | A | 12/2012 | | |
| JP | 2015-130780 | A | 7/2015 | | |
| JP | 2020-089005 | A | 6/2020 | | |
| WO | WO-2015182545 | A1 * | 12/2015 | ............. | H01F 1/057 |

OTHER PUBLICATIONS

Machine Translation of WO_2015182545_A1 (Year: 2015).*
International Search Report and Written Opinion mailed on Feb. 2, 2021, received for PCT Application PCT/JP2020/043729, filed on Nov. 25, 2020, 9 pages including English Translation.
Extended European Search Report issued Nov. 30, 2023 in corresponding European Patent Application No. 20963446.8, 10 pages.
The First Office Action issued Feb. 24, 2025, in Chinese Application No. 202080107248.1, 19 pages including English translation.

* cited by examiner

L1>L2

L1=L2

L1<L2

L1>L2

EMBODIMENT 2

L1>L2

EMBODIMENT 3

PERMANENT MAGNET SYNCHRONOUS MOTOR

CROSS-REFERENCE TO RELATED APPLICATION

The present application is based on PCT filing PCT/JP2020/043729, filed Nov. 25, 2020, the entire contents of which are incorporated herein by reference.

TECHNICAL FIELD

The disclosure of the present application relates to a permanent magnet synchronous motor.

BACKGROUND ART

In permanent magnet synchronous motors for use in machine tools in relation to the industry, onboard vehicles related to the usage for electric automotive vehicles, compressors of air conditioners and the like, it is necessary to keep a terminal voltage where a motor generates not more than its input voltage, in order to output its torque.

In general, as for torque T where a permanent magnet synchronous motor of surface permanent magnet type generates, a q-axis current Iq is required, and thus, the reduction of q-axis current Iq leads to lowering the torque. For this reason, in order to output high torque at a time of fast rotation or high speeds, it is necessary to perform an effective field-weakening control with a low d-axis current Id. In order to perform this, there is a related art document below as a technology which performs an effective field-weakening control with a low d-axis current Id, by making d-axis inductance Ld larger.

In the related art technology, d-axis inductance Ld is made larger by forming protrusions projecting from a rotor core in radial directions so that the protrusions fit in a plurality of permanent magnets placed on a surface of the rotor core, so that the field-weakening control is effectively functioned, and a torque output is improved at a time of fast rotation.

RELATED ART DOCUMENT

Patent Document

[Patent Document 1] Japanese Patent Laid-Open No. 2009-131070

SUMMARY OF THE INVENTION

Problems to be Solved by the Invention

However, in the related art technology, recessed portions are provided at middle portions of permanent magnets each, and protrusions fitting in those portions project from a rotor core. Because the recessed portions of the permanent magnets are formed in rectangle shapes, and because outer periphery shapes of the permanent magnets are made in circular arcs, end-tip portions of the recessed portions each become thinner in their magnet thicknesses. In general, in a permanent magnet, for example, in a neodymium magnet of Nd—Fe—B system or the like, irreversible demagnetization is caused in which residual magnetic flux density is reduced due to magnet's demagnetizing from a stator, and/or due to the magnet's exposure under high temperature environments. In the related art technology, there arises a problem in that thicknesses between the end-tip portions of the recessed portions and the respective circular arcs of magnet's outer periphery become thinner as described above, so that irreversible demagnetization may easily be caused, and a torque output is lowered.

The present disclosure of the application concerned has been directed at solving those problems as described above, and an object of the disclosure is to obtain a permanent magnet synchronous motor by which it becomes possible to curb the degradation of torque characteristics due to irreversible demagnetization, and it also becomes possible to enhance the torque output at a time of fast rotation or high speeds.

Means for Solving the Problems

A permanent magnet synchronous motor disclosed in the disclosure of the application concerned comprises, a rotor including a rotor core made from a magnetic material, and a plurality of permanent magnets attached on a surface of the rotor core, wherein the rotor core includes one protrusion or a plurality of protrusions radially projecting toward a stator, and the permanent magnets each include one recessed portion or a plurality of recessed portions so that the one protrusion or the plurality of protrusions is fitted in thereinside, and wherein, when the shortest distance between outmost part of the recessed portion and an outer periphery's circular arc portion of the permanent magnet is defined as parameter L1, and when the distance between the recessed portion of the permanent magnet and the outer periphery's circular arc portion of the permanent magnet is defined as parameter L2 in such a manner that the distance L2 passes through an intersection point at which a tangential line of outmost part on the recessed portion of the permanent magnet intersects with a parallel line, which defines as its start point a point from which a changeover to the recessed portion occurs from an adhesion surface between the permanent magnet and the rotor core, and which is in parallel with a radial line extending from the center of a shaft of the rotor toward the center of the permanent magnet, the recessed portion satisfies L2≥L1.

Effects of the Invention

According to the permanent magnet synchronous motor disclosed in the disclosure of the application concerned, it becomes possible to curb the degradation of torque characteristics, and it also becomes possible to enhance the torque output at a time of fast rotation or high speeds.

Figure 5A:
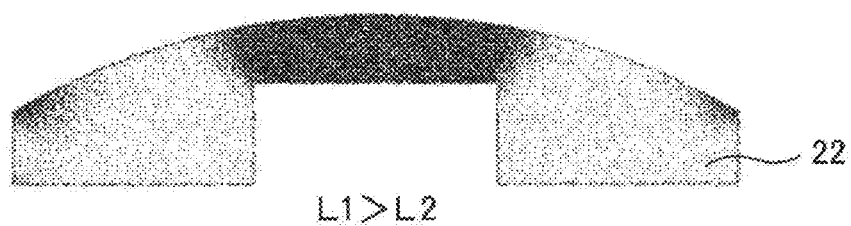
Figure 5B:
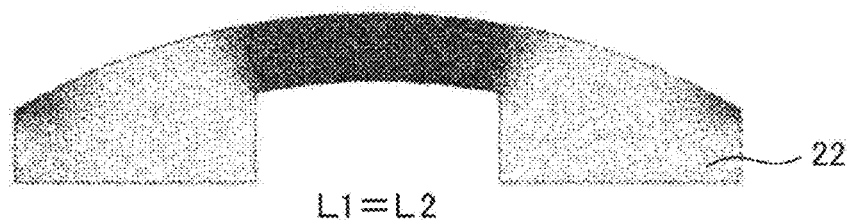
Figure 5C:
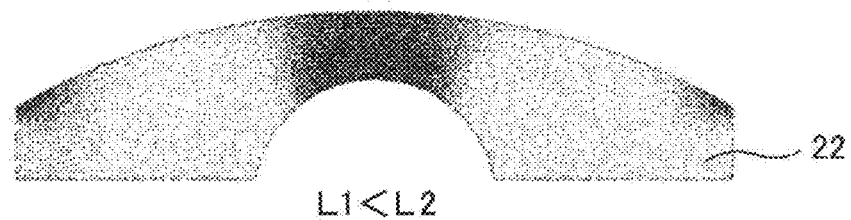
Figure 6:
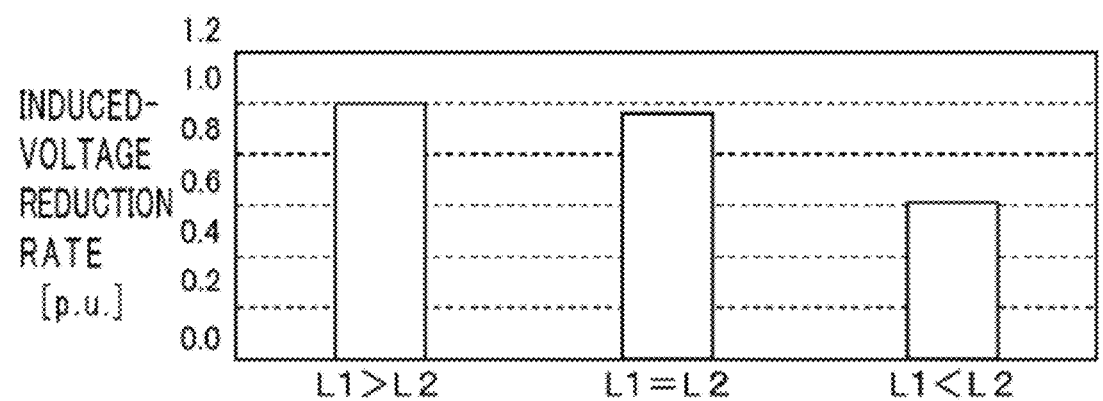
Figure 7:
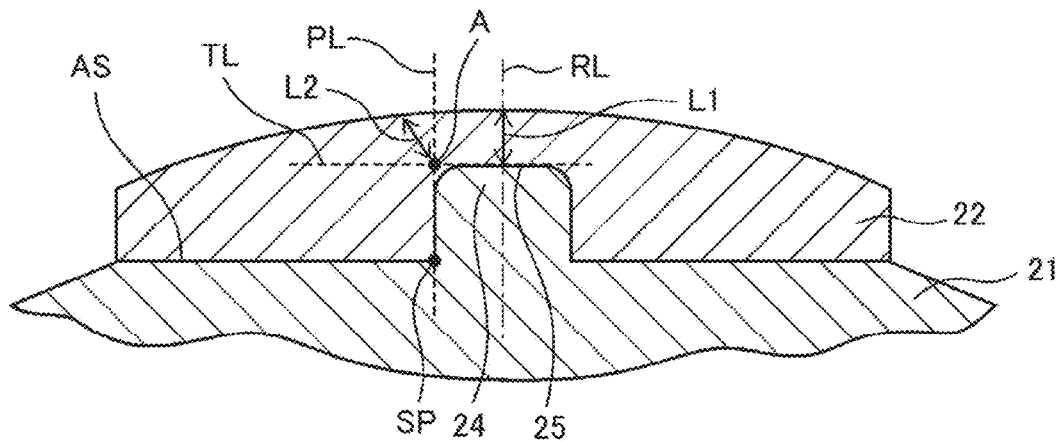
Figure 8:
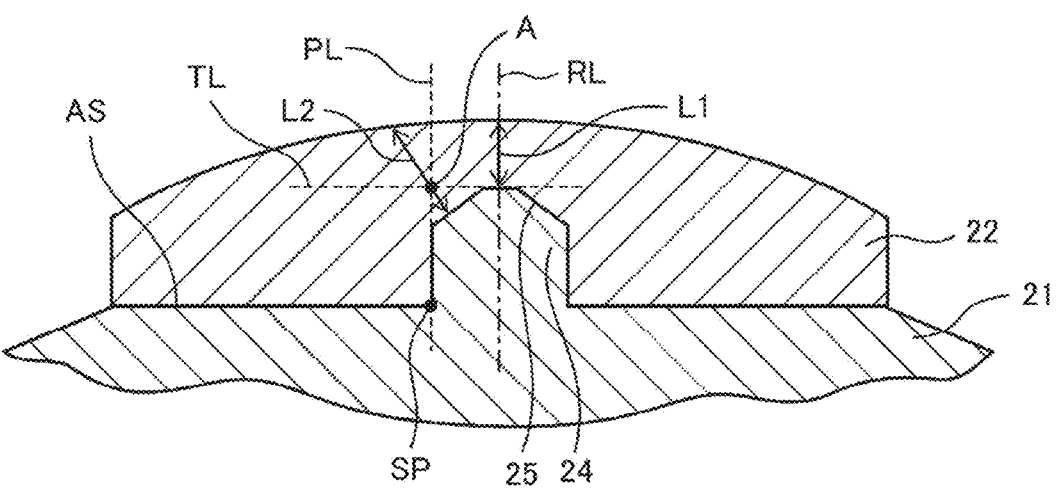
Figure 9:
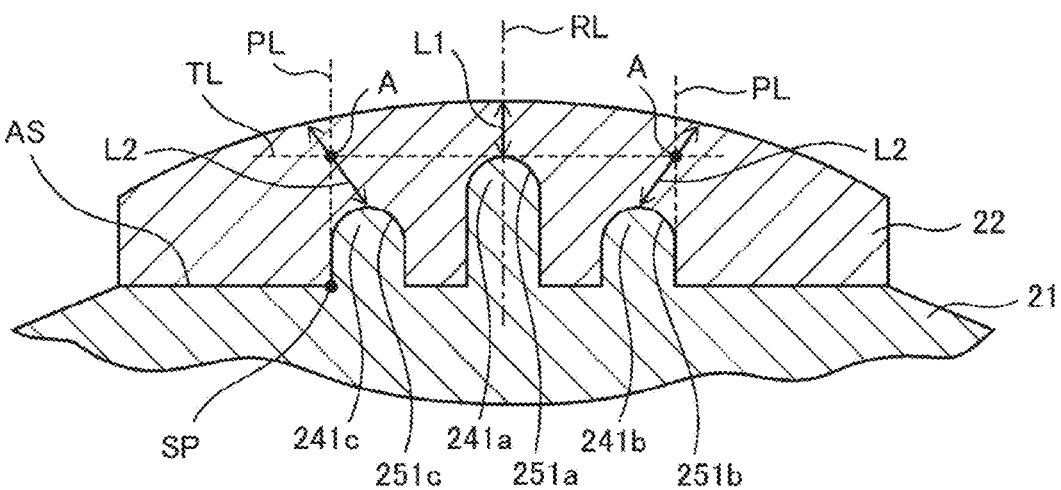
Figure 10A:
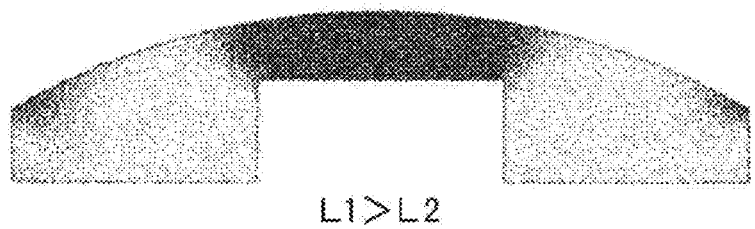
Figure 10B:
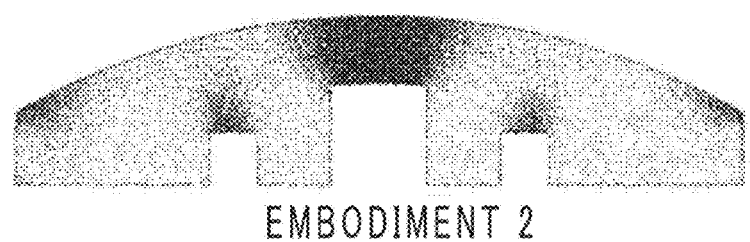
Figure 11:
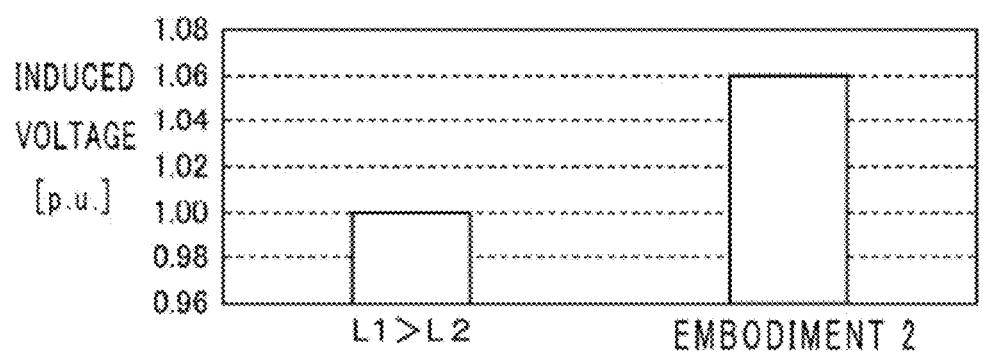
Figure 12:
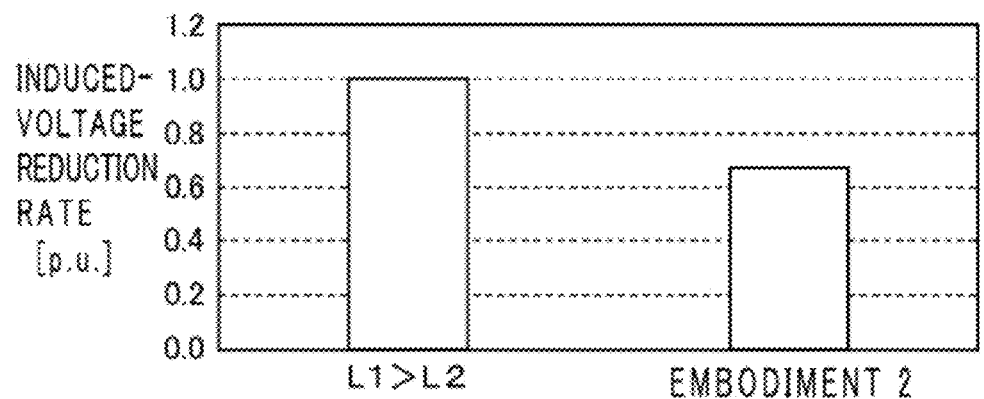
Figure 13:
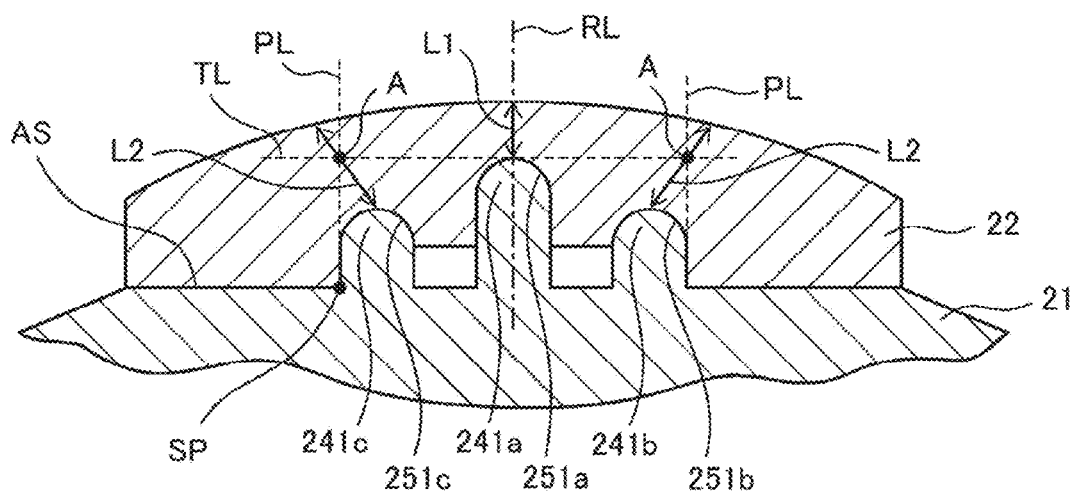
Figure 14:
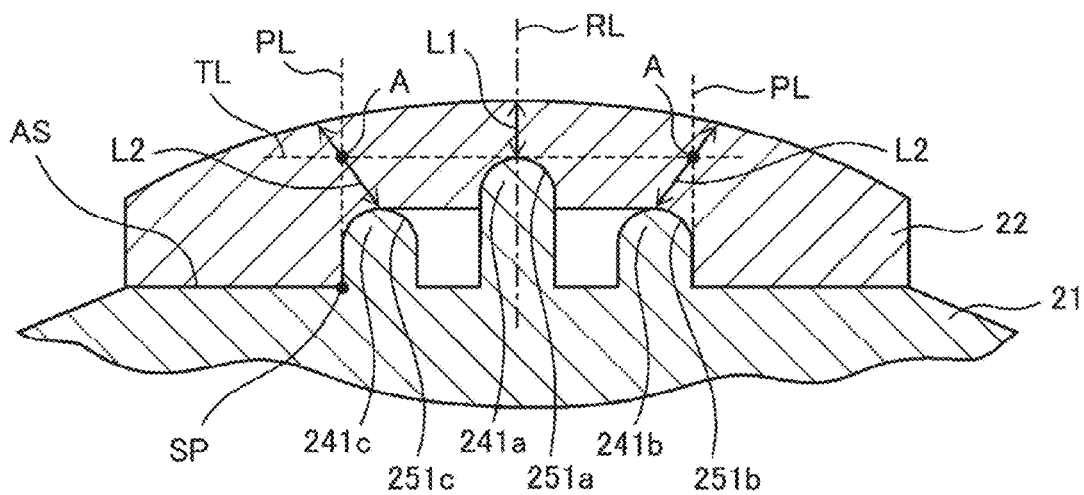
Figure 15:
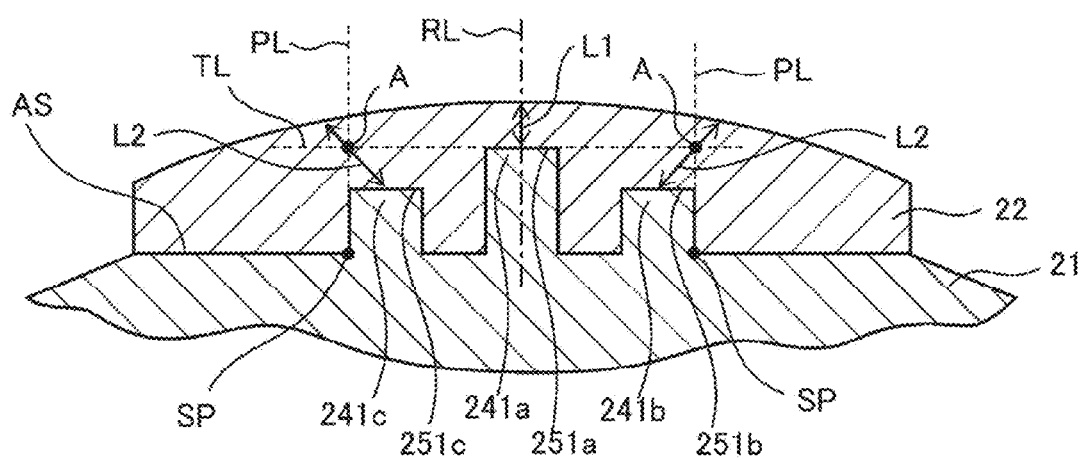
Figure 16:
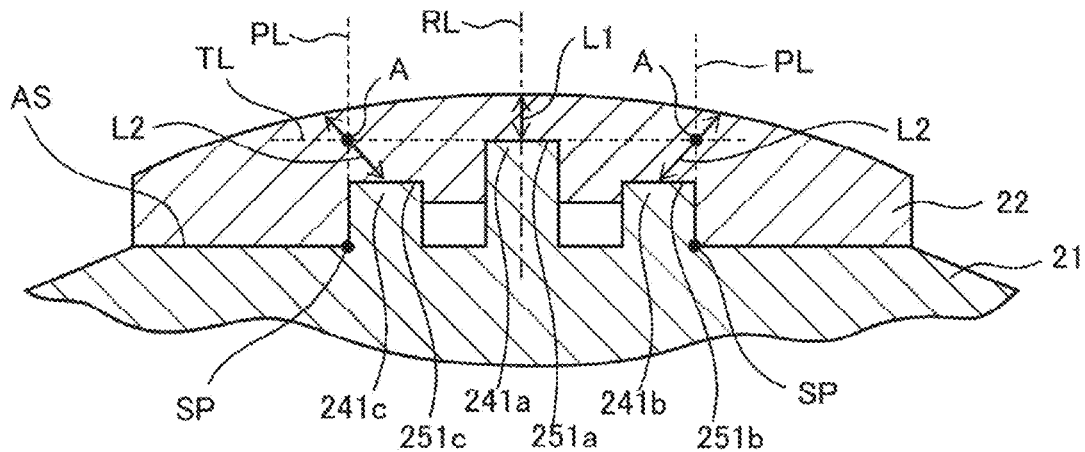
Figure 17:
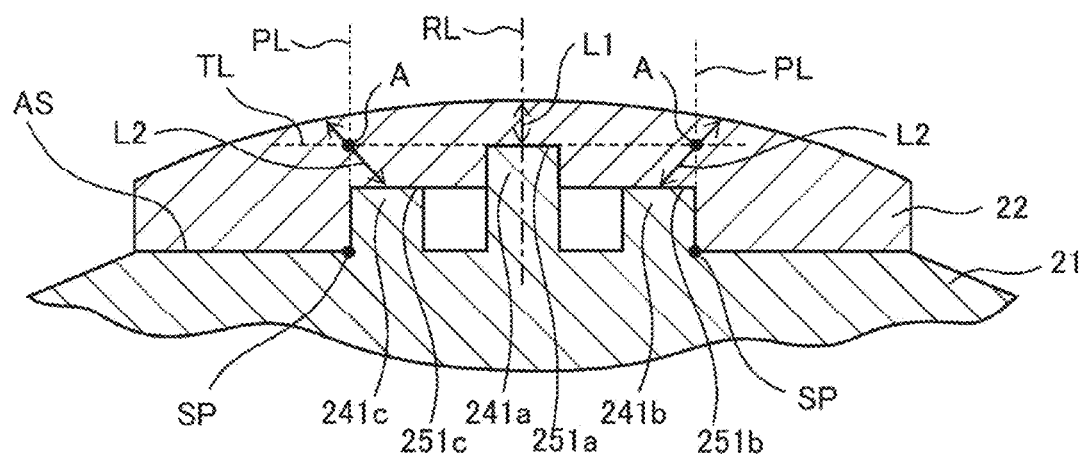
Figure 18:
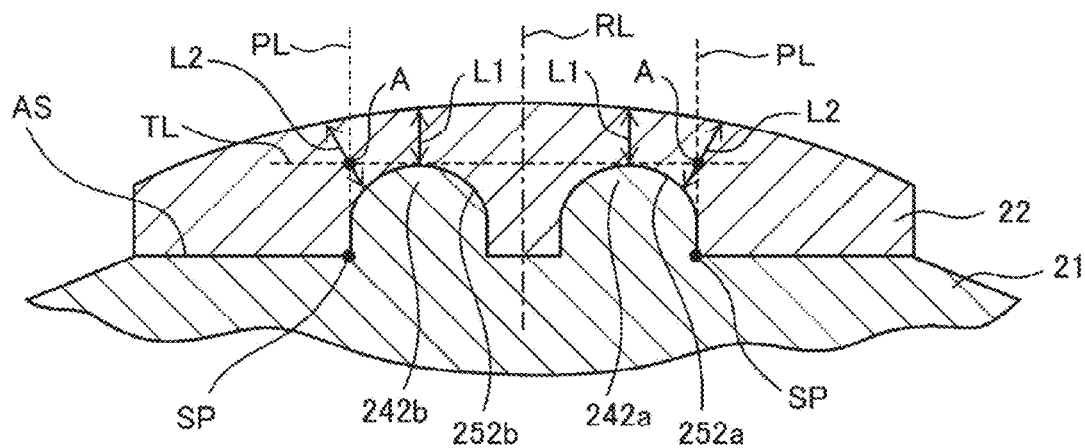
Figure 19A:
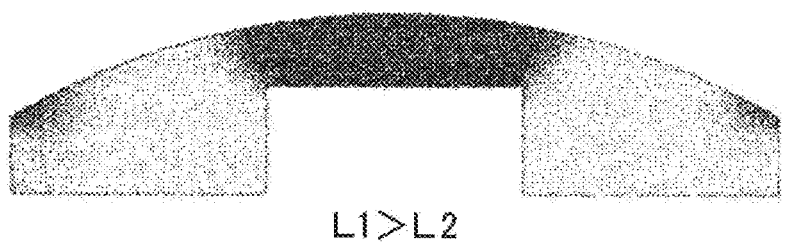
Figure 19B:
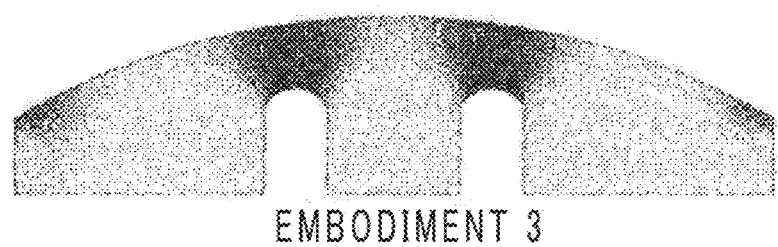
Figure 20:
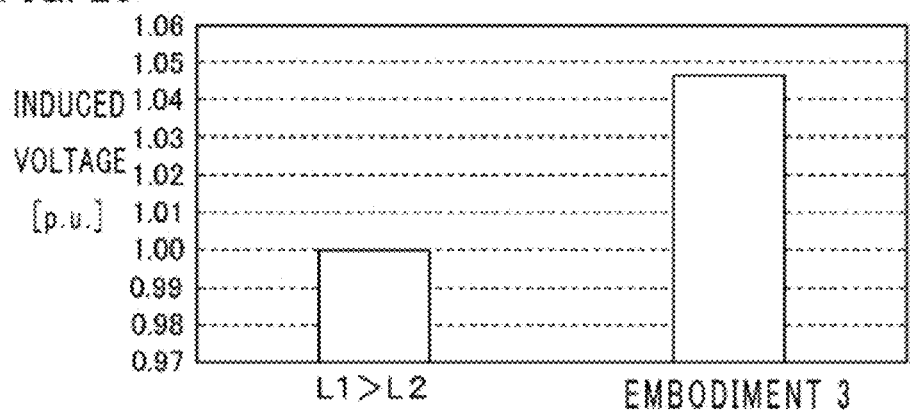
Figure 21:
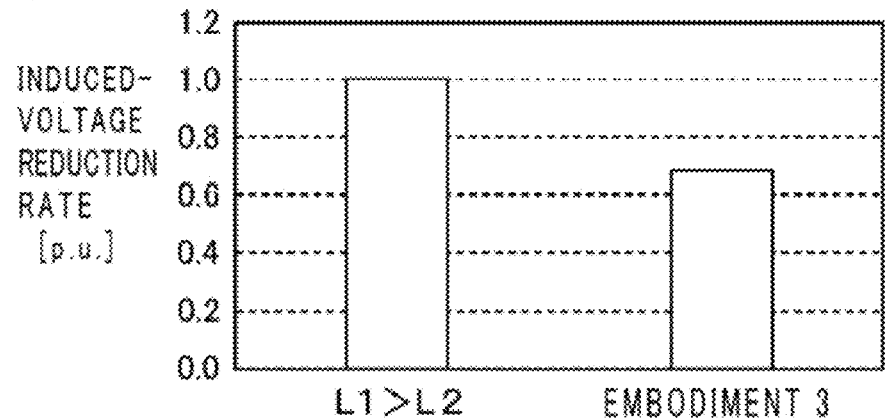
Figure 22:
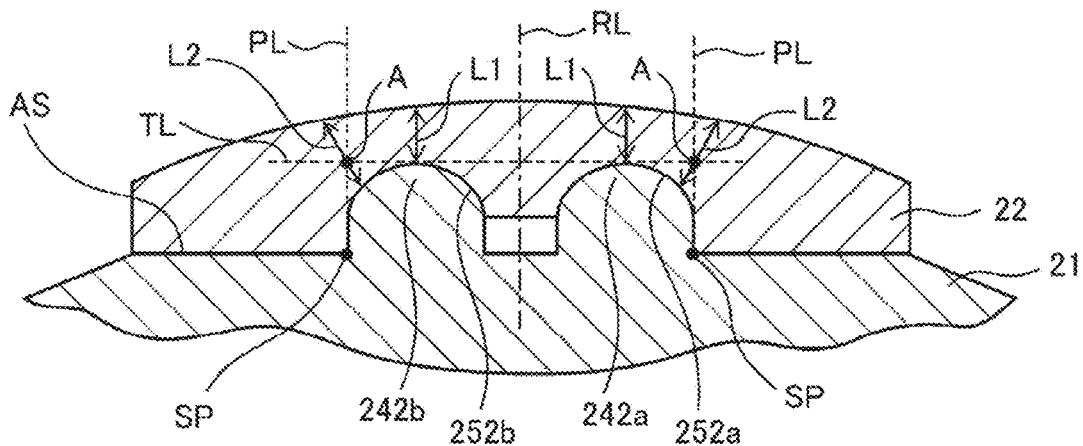
Figure 23:
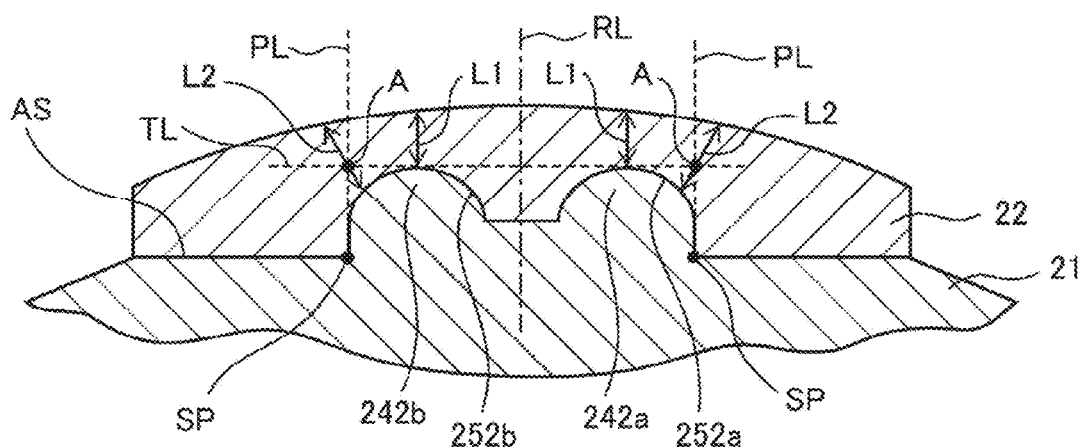
Figure 24:
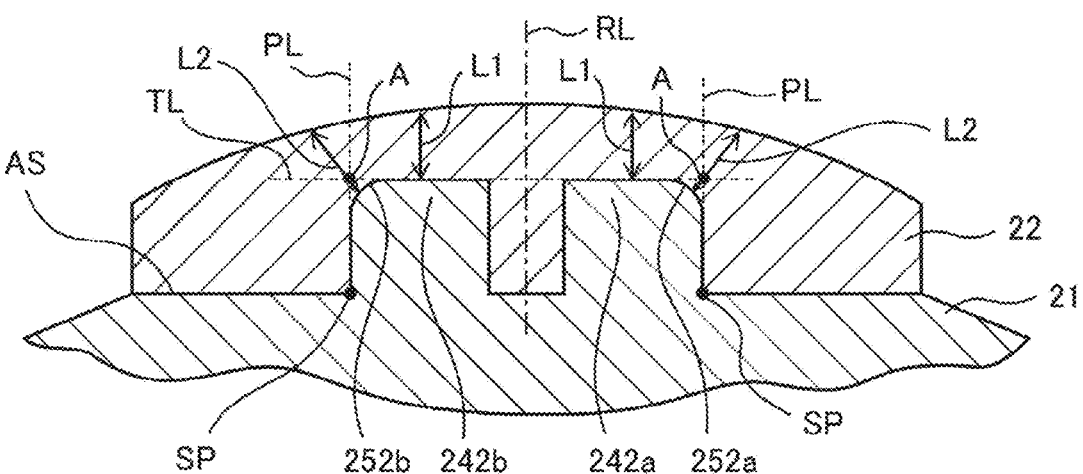
Figure 25:
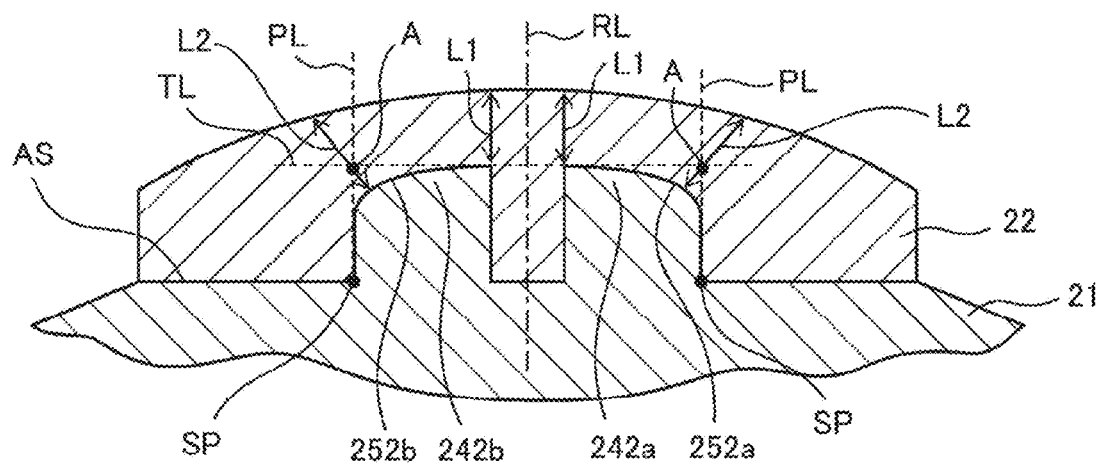
Figure 26:
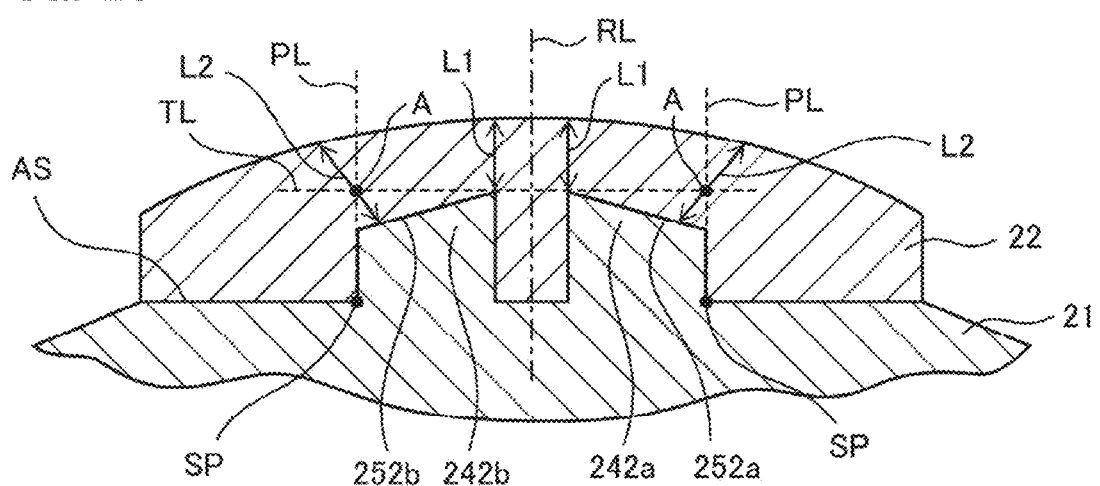
Figure 27:
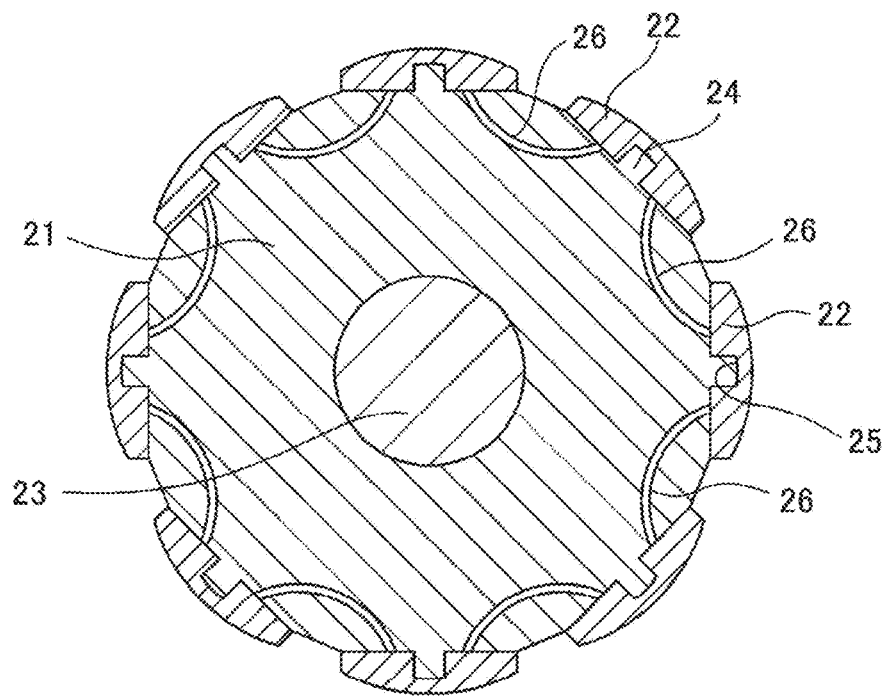
Figure 28:
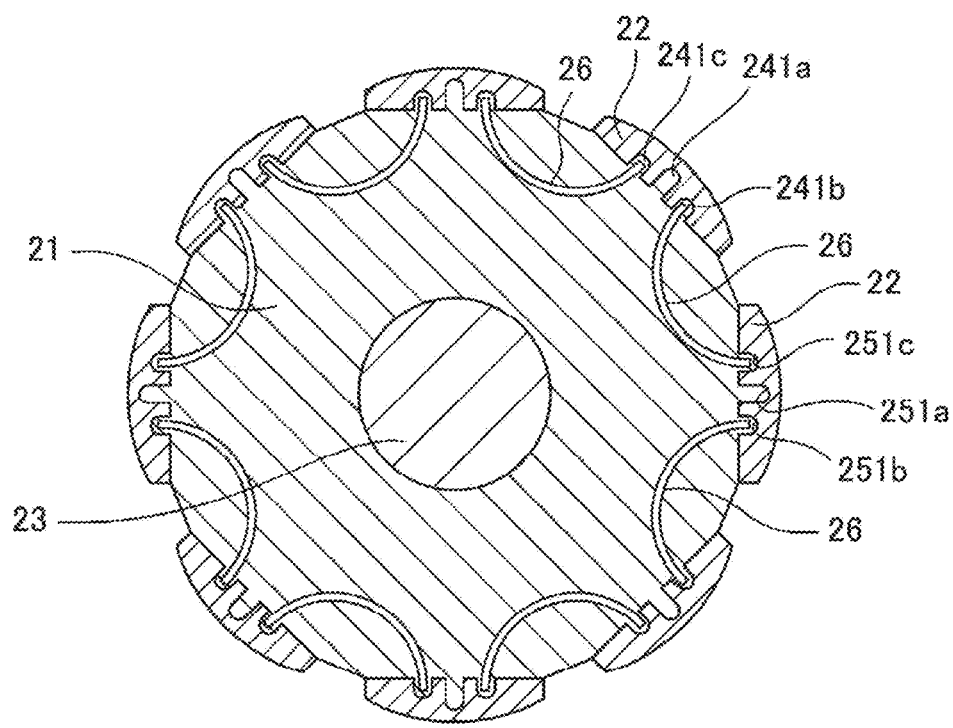
Figure 29:
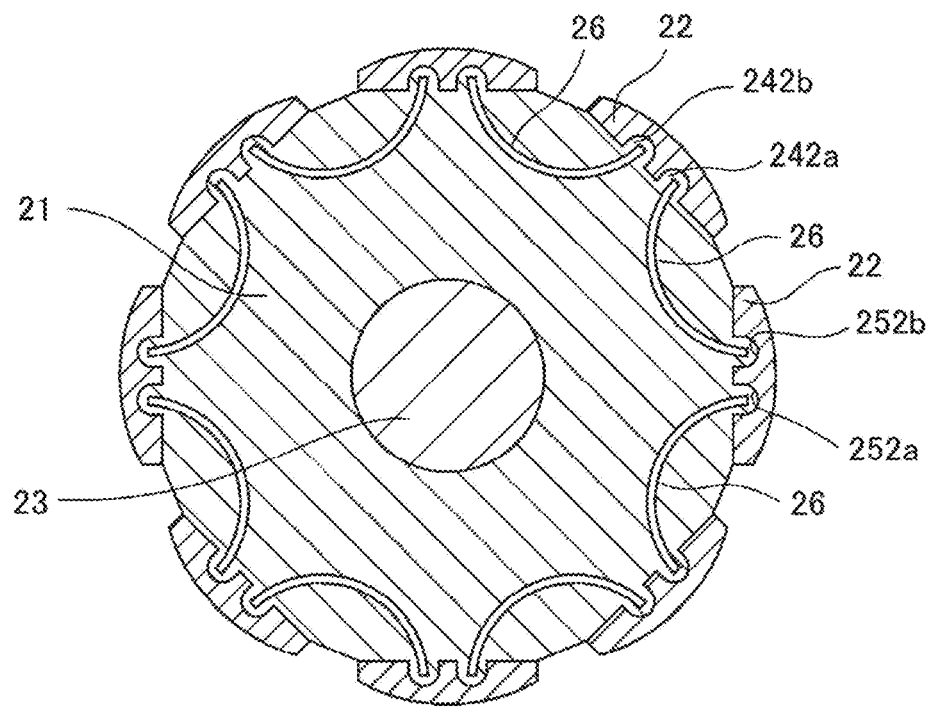

FIGS. 5A, 5B, and 5C are views for comparing demagnetization rate distributions of the permanent magnet synchronous motor according to Embodiment 1 with a demagnetization rate distribution of a permanent magnet of a permanent magnet synchronous motor for the purpose of comparison;

FIG. 6 is a diagram for comparing induced-voltage reduction rates after demagnetization of permanent magnet synchronous motors according to Embodiment 1 with an induced-voltage reduction rate of a permanent magnet synchronous motor for the purpose of comparison;

FIG. 7 is a partially enlarged cross-sectional view illustrating Modification Embodiment 1 of the permanent magnet synchronous motor according to Embodiment 1;

FIG. 8 is a partially enlarged cross-sectional view illustrating Modification Embodiment 2 of the permanent magnet synchronous motor according to Embodiment 1;

FIG. 9 is a cross-sectional view enlarging the vicinity of a permanent magnet along its cross-sectional face being a vertical face of a shaft of a permanent magnet synchronous motor according to Embodiment 2;

FIGS. 10A and 10B are views for comparing a demagnetization rate distribution of the permanent magnet synchronous motor according to Embodiment 2 with that of a permanent magnet synchronous motor for the purpose of comparison;

FIG. 11 is a diagram for comparing an induced voltage before demagnetization of the permanent magnet synchronous motor according to Embodiment 2 with that of a permanent magnet synchronous motor for the purpose of comparison;

FIG. 12 is a diagram for comparing an induced-voltage reduction rate after demagnetization of the permanent magnet synchronous motor according to Embodiment 2 with that of a permanent magnet synchronous motor for the purpose of comparison;

FIG. 13 is a partially enlarged cross-sectional view illustrating Modification Embodiment 1 of the permanent magnet synchronous motor according to Embodiment 2;

FIG. 14 is a partially enlarged cross-sectional view illustrating Modification Embodiment 2 of the permanent magnet synchronous motor according to Embodiment 2;

FIG. 15 is a partially enlarged view illustrating Modification Embodiment 3 of the permanent magnet synchronous motor according to Embodiment 2;

FIG. 16 is a partially enlarged view illustrating Modification Embodiment 4 of the permanent magnet synchronous motor according to Embodiment 2;

FIG. 17 is a partially enlarged cross-sectional view illustrating Modification Embodiment 5 of the permanent magnet synchronous motor according to Embodiment 2;

FIG. 18 is a cross-sectional view enlarging the vicinity of a permanent magnet along its cross-sectional face being a vertical face of a shaft of a permanent magnet synchronous motor according to Embodiment 3;

FIGS. 19A and 19B are views for comparing a demagnetization rate distribution of the permanent magnet synchronous motor according to Embodiment 3 with that of a permanent magnet synchronous motor for the purpose of comparison;

FIG. 20 is a diagram for comparing an induced voltage before demagnetization of the permanent magnet synchronous motor according to Embodiment 3 with that of a permanent magnet synchronous motor for the purpose of comparison;

FIG. 21 is a diagram for comparing an induced-voltage reduction rate after demagnetization of the permanent magnet synchronous motor according to Embodiment 3 with that of a permanent magnet synchronous motor for the purpose of comparison;

FIG. 22 is a partially enlarged cross-sectional view illustrating Modification Embodiment 1 of the permanent magnet synchronous motor according to Embodiment 3;

FIG. 23 is a partially enlarged cross-sectional view illustrating Modification Embodiment 2 of the permanent magnet synchronous motor according to Embodiment 3;

FIG. 24 is a partially enlarged cross-sectional view illustrating Modification Embodiment 3 of the permanent magnet synchronous motor according to Embodiment 3;

FIG. 25 is a partially enlarged cross-sectional view illustrating Modification Embodiment 4 of the permanent magnet synchronous motor according to Embodiment 3;

FIG. 26 is a partially enlarged cross-sectional view illustrating Modification Embodiment 5 of the permanent magnet synchronous motor according to Embodiment 3;

FIG. 27 is a cross-sectional view showing, by way of an example, a rotor in a permanent magnet synchronous motor according to Embodiment 4;

FIG. 28 is a cross-sectional view showing, by way of another example, a rotor in the permanent magnet synchronous motor according to Embodiment 4; and FIG. 29 is a cross-sectional view showing, by way of yet another example, a rotor in the permanent magnet synchronous motor according to Embodiment 4.

EMBODIMENTS FOR CARRYING OUT THE INVENTION

Embodiment 1

Figure 1:
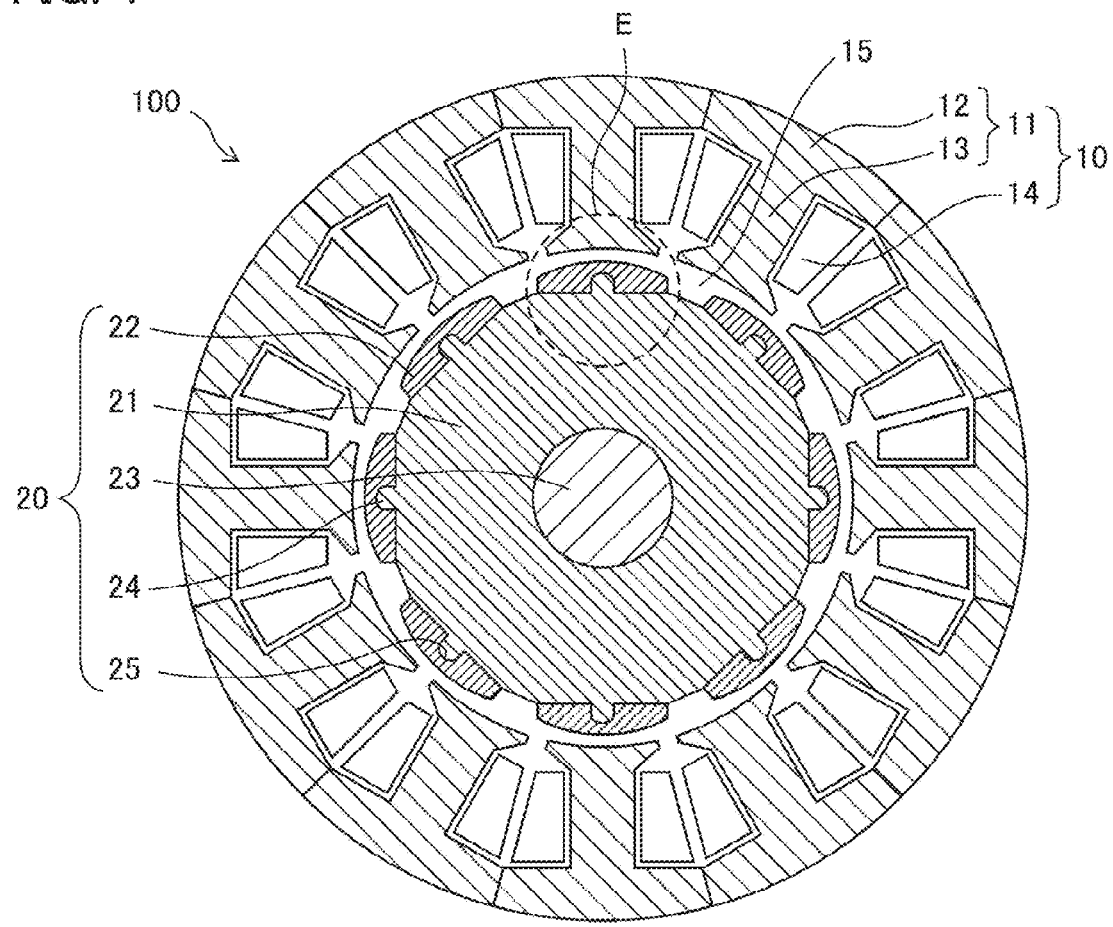
FIG. 1 is a cross-sectional view across a vertical face of a shaft of a permanent magnet synchronous motor according to Embodiment 1.

The explanation will be made for permanent magnet synchronous motors according to Embodiment 1. FIG. 1 is a cross-sectional view showing a configuration of a permanent magnet synchronous motor 100 according to the embodiment in which it is vertically cut across in its axial direction. Here, in the permanent magnet synchronous motor 100, a direction extending along the axial center of a rotor 20 is defined as an axial direction. In a cross-sectional face of the rotor 20 perpendicular to the axial direction, a direction extending along a radius of the rotor 20 is defined as a radial direction. A direction following along a rotational direction of the rotor 20, namely, a direction tracing along a circumference which centers the axial center of the rotor 20 is defined as a circumferential direction in the cross-sectional face described above.

As illustrated in FIG. 1, the permanent magnet synchronous motor 100 includes a stator 10, and the rotor 20 being mounted rotationally movable with respect to the stator 10. The stator 10 is provided to surround the outer circumference of the rotor 20 by way of an interspace or gap 15 functioning as a magnetic gap. The stator 10 includes a stator core(s) 11, and a plurality of coils 14. The stator core(s) 11 includes core back(s) 12 circularly formed on a ring, and a plurality of teeth 13 each of which projects toward its respective inner circumferential side from the core back(s) 12.

The plurality of coils 14 are wound on the plurality of respective teeth 13. In the configuration shown in FIG. 1, the twelve teeth 13 and the twelve coils 14 are provided. In the embodiment, the core back(s) 12 is made in such a manner that a plurality of core blocks each formed in a circular arc manner is circularly joined on the ring; however, the core back(s) 12 may be integrally formed. In addition, the core back(s) 12 and each of the teeth 13 may be separately formed from one another.

The rotor 20 forming a surface-side permanent magnet motor (SPM) is constituted of a rotor core 21, and a plurality of permanent magnets 22 where each one is circumferentially placed on the surface of the rotor core 21. The permanent magnets 22 are placed so that, when one magnetic polarity on an outer periphery side of the permanent magnets 22 circumferentially neighboring to each other is at the N-pole, the other one takes on the S-pole so that their directions of magnetization differ from one another. Namely, the permanent magnets are placed so that the magnetic polarities of faces of permanent magnets neighboring between each other and opposing to a stator take on different magnetic poles from each other.

Here, FIG. 1 shows a so-called permanent magnet synchronous motor of eight poles and twelve slots in which the number of the teeth 13 and the number of the coils 14 are each twelve, and the number of the permanent magnets 22 is eight; however, the combinations of the number of the permanent magnets 22, that of the teeth 13 and that of the coils 14 may not be necessarily limited to these. In addition, the number of the teeth 13 and the number of the coils 14 are made in the same number; however, they may be different from each other.

The rotor core 21 has, for example, a structure in which a plurality of core sheets is laminated in axial directions. The rotor core 21 includes a shaft 23 passing through the rotor core in an axial direction. The rotor core 21 includes protrusions 24 each radially projecting therefrom, and the permanent magnets 22 each of which includes a respective recessed portion 25 in which the protrusion 24 is fitted thereinside. The explanation will be made in detail referring to FIG. 2 for the protrusion 24 and the recessed portion 25.

Figure 2:
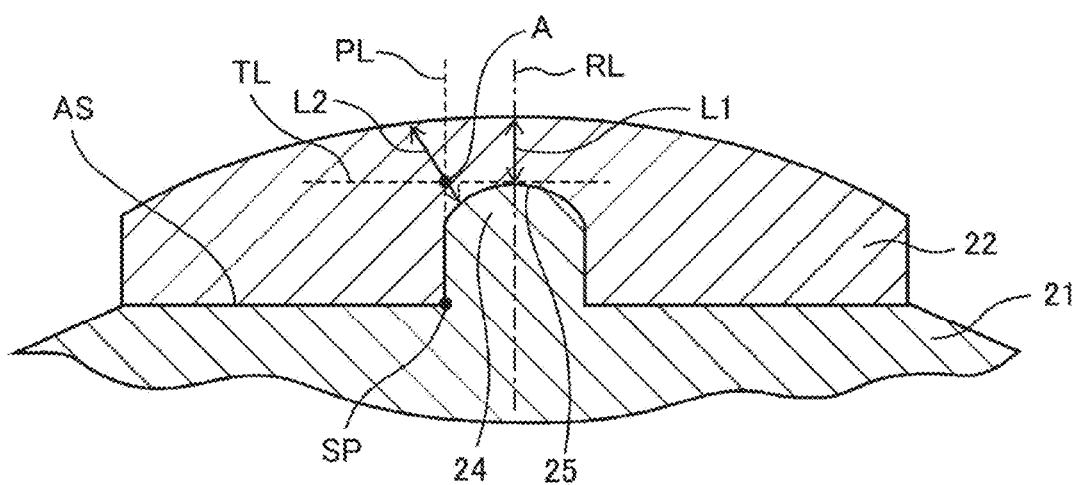
FIG. 2 is a cross-sectional view enlarging the vicinity of a permanent magnet along its cross-sectional face being a vertical face of the shaft of the permanent magnet synchronous motor according to Embodiment 1.

FIG. 2 is an enlarged view of a portion surrounded by the broken line circle "E" of FIG. 1. A radial line RL is defined which extends toward the middle of the permanent magnet 22 from the axial center in a radial direction. A surface contacting between the rotor core 21 and the permanent magnets 22 is defined as an attachment or adhesion surface AS; and a line which is in parallel with the radial line RL and which defines as a start point SP a point on the adhesion surface AS from which a change to the recessed portion 25 occurs is defined as a parallel line PL. In addition, a line making in contact with outmost part of the recessed portion 25 and being perpendicular to the radial line RL is defined as a tangential line TL. A point in which the tangential line TL and the parallel line PL intersect with each other is defined as an intersection point "A." When the shortest distance from the outmost part of the recessed portion 25 of the permanent magnet 22 up to an outer periphery's circular arc of the permanent magnet 22 is defined as parameter L1, and when the shortest distance, passing through the intersection point "A," between an outer periphery's circular arc of the permanent magnet 22 and the recessed portion 25 is defined as parameter L2, the recessed portion 25 has a shape to satisfy "L1≤L2," and end-tip portions of the recessed portion are formed in circular arc shapes as in FIGS. 1 and 2.

Figure 3:
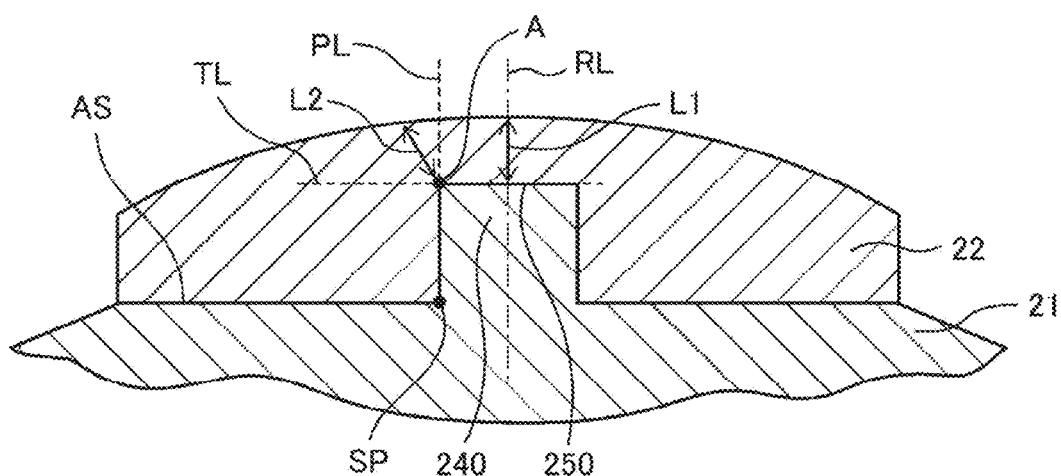
FIG. 3 is a cross-sectional view enlarging the vicinity of a permanent magnet along its cross-sectional face being a vertical face of a shaft of a permanent magnet synchronous motor of a related art technology being in contrast to Embodiment 1.

FIG. 3 is a cross-sectional view showing a configuration of a conventional permanent magnet synchronous motor in which it is vertically cut across in its axial direction, in order to compare it with the permanent magnet synchronous motor 100 according to Embodiment 1. Here, as for a stator, its diagrammatic description is omitted. In FIG. 3, as for configurations for which the explanation is not made, it is so defined that they are similar to those in FIG. 1. In FIG. 3, a protrusion 240 of the rotor core 21 and a recessed portion 250 of the permanent magnet 22 are formed in rectangle shapes, and the relationship of "L1>L2" is given.

Next, the explanation will be made for effects of the embodiment.

A permanent magnet synchronous motor cannot output torque T by generating a terminal voltage Vt which exceeds a motor's input voltage Vi. In general, the terminal voltage Vt increases in accordance with the expressions given by next Expressions (1) through (4) when the number of revolutions is raised.

$$Vt = \sqrt{(Vd^2 + Vq^2)} \quad (1)$$

$$Vd = RId + \omega LqIq \quad (2)$$

$$Vq = RIq + \omega \Phi m + \omega LdId \quad (3)$$

$$\omega = 2\pi f = 2\pi (N/60) pn \quad (4)$$

Here, Vd and Vq designate a d-axis voltage and a q-axis voltage, respectively; R, phase resistance; Id and Iq, a d-axis current and a q-axis current, respectively; $\Phi m$, permanent magnet's magnetic flux; Ld and Lq, d-axis inductance and q-axis inductance, respectively; $\omega$, an angular velocity; f, a frequency; N, the number of revolutions per one minute; and pn, the number of pole pairs. In a permanent magnet synchronous motor, there exists a so-called field-weakening control as a control scheme for increasing a torque output at a high number of revolutions in which the increase of the terminal voltage is suppressed. The field-weakening control is a control scheme in which a d-axis current Id is energized in the direction to weaken permanent magnet's magnetic flux $\Phi m$; however, when d-axis inductance Ld is small, it is necessary to flow a high d-axis current Id. However, there exists an upper limit to an electric current to energize through a motor, and so, next Expression (5) is given when an electric current supplied from an inverter into the motor is defined as "Iinv."

$$\sqrt{3} \times Iinv = \sqrt{(Id^2 + Iq^2)} \quad (5)$$

Torque T where a permanent magnet synchronous motor of SPM type outputs is in general given as next Expression (6):

$$T = Pn\Phi mIq \quad (6)$$

Figure 4:
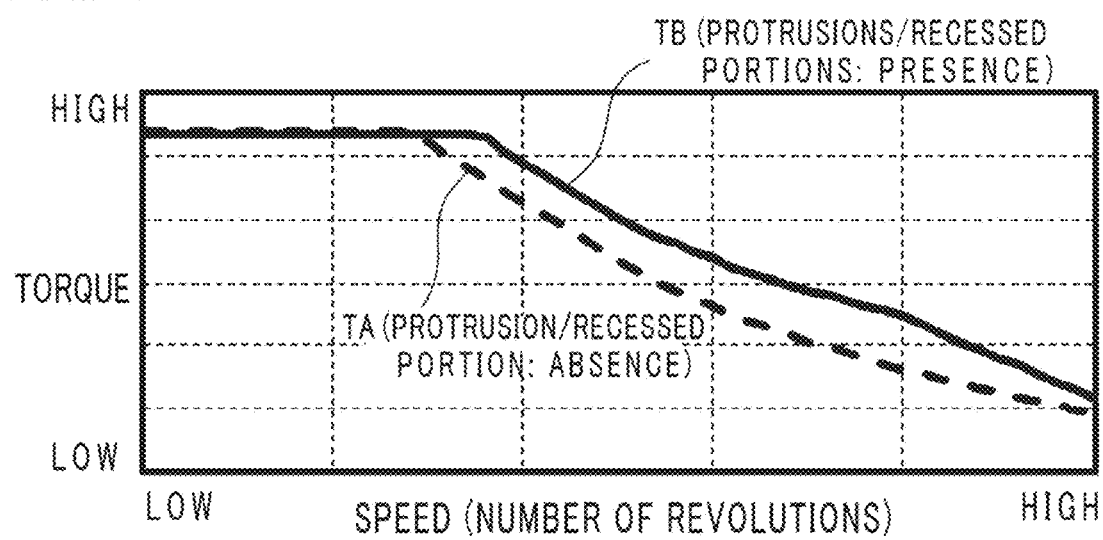
FIG. 4 is a diagram which compares speed-torque characteristics in accordance with the presence of protrusions/ recessed portions of a permanent magnet synchronous motor, or with the absence of such protrusions/recessed portions thereof.

And thus, when a d-axis current Id increases, a q-axis current Iq for outputting the torque T is decreased, so that a torque output is lowered. Therefore, in order to increase the torque T at a high number of revolutions, it is necessary to effectively obtain field-weakening control with a low d-axis current Id, so that d-axis inductance Ld ought to be increased. In order to achieve this, it is possible to enhance the d-axis inductance Ld by taking on the structure shown in FIG. 3. FIG. 4 is a diagram called as speed-torque characteristics in which the horizontal axis indicates a speed (the number of revolutions), and the vertical axis, a torque output. As shown in FIG. 4, it can be understood that, by applying the protrusions 24 and the recessed portions 25, the torque output is increased at a high number of revolutions (high speeds).

However, in a case in which the shape of the recessed portion 250 of the permanent magnet 22 is formed in a rectangle shape in such a manner described above, and in a case in which outer periphery shapes of the permanent magnets 22 are made in circular arcs as in a rotating machine, the distances to the outer periphery of the permanent magnets 22 each become significantly short at end-tip portions of the recessed portion 250. As for a permanent magnet, there exists a phenomenon called as irreversible demagnetization in which residual magnetic flux density Br of permanent magnet is reduced due to a temperature rise in the permanent magnet and/or due to demagnetizing where magnetic flux is added from a stator in an opposite direction to a direction of magnetization. The easiness of the irreversible demagnetization is related to a permeance coefficient Pc which is determined by coercive field strength of permanent magnet and a magnetic circuit thereof. The permeance coefficient Pc depends on the thickness of direction of magnetization in a permanent magnet, and on magneto-resistance or magnetic reluctance. A permeance coefficient Pc can be approximated by next Expression (7) in a magnetic circuit whose magnetic gap between a stator and a rotor is narrow in such a permanent magnet synchronous motor, when the thickness of direction of magnetization in a permanent magnet is defined as parameter "Hm," and a magnetic gap between the stator and the rotor, as parameter "gm."

$$Pc \approx Hm/gm \quad (7)$$

FIGS. 5A, 5B and 5C are views showing the results calculated by means of a magnetic analysis on demagnetization states of the permanent magnets 22. FIG. 5A shows a demagnetization rate distribution in a case of "L1>L2"; FIG. 5B, that in a case of "L1=L2"; and FIG. 5C, that in a case of "L1<L2." Dense portions indicate that a demagnetization rate is high, whereas light portions indicate that the demagnetization rate is low. In a case in which the shortest distance L2 between an outer periphery of the permanent magnet 22 and the recessed portion 250 becomes narrow as shown in FIG. 3, the demagnetization proceeds in wide ranges as shown in FIG. 5A.

In Embodiment 1, the recessed portion 25 of the permanent magnet 22 is formed in a circular arc shape as shown in FIGS. 1 and 2 so that the shortest distance L2 between an outer periphery of the permanent magnet 22 and the recessed portion 25 satisfies "L1≤L2."

As shown in FIGS. 5A, 5B and 5C, it can be understood that, by taking on parameter L2 to be made longer, the demagnetization is suppressed. In addition, FIG. 6 is a diagram indicating a rate of an induced-voltage reduction which occurs after demagnetization with respect to a rate of that which does not occur before it in each of the shapes shown in FIGS. 5A, 5B and 5C; in the diagram, an induced-voltage reduction rate in a case of "L1>L2" is normalized at 1.0. As shown in FIG. 6, it can be understood that induced-voltage reduction rates are made smaller in comparison with the case of "L1>L2" being the related art technology. Herein, the reduction of induced voltage, namely, the reduction of permanent magnet's magnetic flux Φm is lead to, so that this means none other than the reduction of the torque T described above, which results in torque reduction in low speed ranges. Moreover, according to Embodiment 1, the speed-torque characteristics shown in FIG. 4 do not change, so that it becomes possible to similarly obtain the effect of output enhancement.

FIG. 7 is a partially enlarged view in Modification Embodiment 1 of the permanent magnet synchronous motor according to Embodiment 1. A different point between FIG. 1 and FIG. 7 is only a point in which a shape at outmost part of the recessed portion 25 of the permanent magnet 22 is made in a circular arc, or is made flat to have rounded parts at end-tip portions, so that there is no difference in obtainable effects also in the shape of FIG. 7. In addition, FIG. 8 is also a partially enlarged view in Modification Embodiment 2 of the permanent magnet synchronous motor according to Embodiment 1. FIG. 8 differs in a point between FIG. 1 and FIG. 8 in which end-tip portions of the recessed portion 25 of the permanent magnet 22 are formed tilted or oblique; however, in the shape also, obtainable effects do not differ from those of the structure shown in FIG. 1.

In addition, the protrusion 24 of the rotor core 21 and the recessed portion 25 of the permanent magnet 22 shown in Embodiment 1 are in contact in all the faces with each other; however, all the faces may not be necessarily making in contact with each other, but certain one face may only be made in contact with one another. From a viewpoint of manufacturing, if it is intended to prevent intersecting and/or chipping or like of a permanent magnet(s) at a time of manufacturing, it is desirable that the dimensions of the recessed portion 25 of the permanent magnet 22 are larger than those of the protrusion 24 of the rotor core 21. Moreover, when the increase of a torque ripple(s) and that of cogging torque due to the influence of a placement deviation of the permanent magnet 22 are taken into consideration, it is possible to minimize placement-position deviation of the permanent magnet by shifting it away with an offset toward a certain face.

Embodiment 2

The explanation will be made for permanent magnet synchronous motors according to Embodiment 2. FIG. 9 is a cross-sectional view enlarging the vicinity of the permanent magnet 22 similarly to FIG. 2 in which a permanent magnet synchronous motor according to Embodiment 2 is vertically cut across in its axial direction. Although not shown in FIG. 9, the motor is constituted of the stator 10 and the rotor 20 similarly to FIG. 1.

In FIG. 9, the permanent magnet synchronous motor according to the embodiment differs from the permanent magnet synchronous motor according to Embodiment 1 in the following points.

Recessed portions of the permanent magnet 22 have three positions of a recessed portion 251a, a recessed portion 251b and a recessed portion 251c, and so, protrusions radially projecting from the rotor core 21 have three of a protrusion 241a, a protrusion 241b and a protrusion 241c, respectively.

In addition, in Embodiment 2, the recessed portion 251a and the protrusion 241a each positioned at the middle portion of the permanent magnet 22 are placed on the outermost periphery side as shown in FIG. 9.

The rotor core includes an odd number of protrusions per one pole, and includes a protrusion aggregate group or set which forms the plurality of protrusions as one group of protrusions; and, on a circumferentially outer side of the protrusion aggregate set, the recessed portions are formed so that the shortest distance L2 between a recessed portion on a circumferentially outer side and a respective outer periphery's circular arc portion of the permanent magnet satisfies "L1≤L2."

The shortest distance L1 designated in Embodiment 1 becomes the shortest distance between outmost part of the recessed portion 251a of the permanent magnet 22 and an outer periphery's circular arc of the permanent magnet 22. In addition, the shortest distance L2 designated in Embodiment 1 passes through an intersection point "A" at which a tangential line TL making in contact with the outmost part on the recessed portion 251a of the permanent magnet 22 intersects with a parallel line PL which defines as its start point SP a point of outmost part in a circumferential direction from which a changeover to the recessed portion 251b or the recessed portion 251c occurs from an attachment or adhesion surface AS of the permanent magnet 22 and which is in parallel with a radial line RL extending from the center of the shaft of the rotor 20 toward the middle of the permanent magnet 22 as shown in FIG. 9, so that the shortest distance L2 becomes the shortest distance between the recessed portion 251b and an outer periphery's circular arc of the permanent magnet 22 or between the recessed portion 251c and an outer periphery's circular arc thereof.

Here, in FIG. 9, the recessed portion 251b and the recessed portion 251c take on the same dimensions; however, it is not necessarily required to take on the same dimensions. However, when consideration is taken into from a viewpoint of decreasing a torque ripple(s), cogging torque and the like, it is more desirable to take on the same dimensions.

Next, the explanation will be made for effects of Embodiment 2.

FIGS. 10A and 10B are views showing a demagnetization rate distribution of the permanent magnet 22 according to Embodiment 2 and a demagnetization rate distribution of that of the related art technology for the sake of comparison, respectively. FIG. 10A shows a demagnetization rate distribution in a case of "L1>L2"; FIG. 10B, that in a case of Embodiment 2. Dense portions indicate that a demagnetization rate is high, whereas light portions indicate that the demagnetization rate is low. As shown in FIGS. 10A and 10B, it can be understood that, also in Embodiment 2, the distribution where a demagnetization rate is high is narrowed similarly to those of Embodiment 1. In addition, FIG. 11 and FIG. 12 are diagrams showing an induced voltage before demagnetization and a respective induced-voltage reduction rate after demagnetization in Embodiment 2, and those of an embodiment of "L1>L2" in such related art technology. Here, each of the figures is a diagram in which an induced voltage of the related art technology and an induced-voltage reduction rate thereof are normalized at 1.

As shown in FIG. 11 and FIG. 12, it can be understood that the induced voltage of Embodiment 2 is larger with respect to that of the related art technology, and that the induced-voltage reduction rate being lowered due to demagnetization is smaller with respect to that of the related art technology.

Because of the manner described above, by taking on the embodiment of FIG. 9 in which a plurality of recessed portions is included in the permanent magnet 22 and a plurality of respective protrusions is included in the rotor core 21, it becomes possible to curb characteristics degradation of the motor in comparison with the related art technology. In addition, it is possible to obtain an output increase effect of speed-torque characteristics similarly to FIG. 4 at high speed ranges, because of having the protrusions.

FIG. 13 and FIG. 14 are partially enlarged views in Modification Embodiment 1 of the permanent magnet synchronous motor according to Embodiment 2 and Modification Embodiment 2 thereto, respectively; they differ from FIG. 9 in the following points.

The protrusions 241a through 241c of the rotor core 21 and the recessed portions 251a through 251c of the permanent magnet 22 differ in their shapes, and the permanent magnet 22 is not totally fitted in between the protrusion 241a and the protrusion 241b, and between the protrusion 241a and the protrusion 241c, so that the permanent magnet has respective cavities. The cavities in FIG. 14 are formed larger than the cavities in FIG. 13. In general, because a magnet of Nd—Fe—B system for use in permanent magnets uses heavy rare-earth, the magnet is expensive. By taking on such configurations, the amount of usage for the permanent magnets 22 is cut down, so that reduction of the costs can be achieved. In addition, machining of the permanent magnets can also be made easier, so that the costs for machining can be cut down.

By configuring as FIG. 13 or FIG. 14, an induced voltage may be lowered in a certain degree; however, there would not be a problem caused because those effects similar to the effects described in Embodiment 2 can be obtained.

FIG. 15 is a partially enlarged view in Modification Embodiment 3 of FIG. 9 indicating Embodiment 2, and is in the same configuration with respect to Embodiment 2 other than the difference in which the shapes of the protrusions 241a through 241c, and those of the recessed portions 251a through 251c are made rectangularly shaped. For this reason, there would not be a problem caused because those effects similar to the effects described in Embodiment 2 can be obtained.

FIG. 16 and FIG. 17 are partially enlarged views in Modification Embodiment 4 and Modification Embodiment 5 which are modification examples of FIG. 13 and FIG. 14 shown as Modification Embodiments of Embodiment 2, respectively. Similar configurations are adopted other than the difference in which, with respect to FIG. 13 and FIG. 14, the shapes of the protrusions 241a through 241c, and those of the recessed portions 251a through 251c are made rectangularly shaped. For this reason, it is possible to obtain those effects similar to the effects described in Embodiment 2, so that there would not be a problem caused.

The permanent magnet shown in FIG. 9, FIG. 13 through FIG. 17 each as Embodiment 2 takes on a shape including three protrusions; however, there would not be a problem caused when the number of protrusions takes on an odd number of three or more.

Embodiment 3

The explanation will be made for permanent magnet synchronous motors according to Embodiment 3. FIG. 18 is a diagram enlarging the vicinity of a permanent magnet of a rotor in a permanent magnet synchronous motor according to Embodiment 3, and is a cross-sectional view in which the permanent magnet is vertically cut across in an axial direction of the shaft.

In FIG. 18, the rotor differs from that of Embodiment 1 in the following points. The number of protrusions projecting from the rotor core 21 is two, and that of recessed portions of the permanent magnet 22 is also two. The shortest distance L1 is defined as the shortest distance between outmost part of either a recessed portion 252a of the permanent magnet 22 or a recessed portion 252b thereof and an outer periphery's circular arc of the permanent magnet, so that the shortest distance in not at the vicinity of the middle of permanent magnet, differing from Embodiments 1 and 2. In addition, the shortest distance L2 is defined as follows. A tangential line TL is defined which makes in contact with the outmost part of the recessed portion 252a of the permanent magnet or the recessed portion 252b thereof. When a changeover point from an attachment or adhesion surface AS between the rotor core 21 and the permanent magnet 22 to the recessed portion 252a of the permanent magnet or to the recessed portion 252b thereof is defined as a start point SP from which a parallel line PL being in parallel with a radial line RL extending from the axial center of the rotor 20 toward the middle of the permanent magnet 22 is defined, the shortest distance L2 passes through an intersection point at which the tangential line TL and the parallel line PL intersect with each other, and the shortest distance between the recessed portion 252a of the permanent magnet 22 and an outer periphery's circular arc portion of the permanent magnet 22 or between the recessed portion 252b and an outer periphery's circular arc portion thereof is defined as parameter L2.

The relationship between parameters L1 and L2 satisfies "L1≤L2" similarly to Embodiments 1 and 2.

As described above, the rotor core includes an even number of protrusions per one pole, and includes a protrusion aggregate group or set which forms the plurality of protrusions as one group of protrusions; and, on a circumferentially outer side of the protrusion aggregate set, the recessed portions are formed so that the shortest distance L2 between a recessed portion on a circumferentially outer side and a respective outer periphery's circular arc portion of the permanent magnet satisfies "L1≤L2."

Next, the explanation will be made for effects of Embodiment 3.

FIGS. 19A and 19B are views showing a demagnetization rate distribution of the permanent magnet 22 according to Embodiment 3 and a demagnetization rate distribution of that of the related art technology for the sake of comparison, respectively. FIG. 19A shows a demagnetization rate distribution in a case of "L1>L2"; FIG. 19B, that in a case of Embodiment 3. Dense portions indicate that a demagnetization rate is high, whereas light portions indicate that the demagnetization rate is low. As shown in FIGS. 19A and 19B, it can be understood that, also in Embodiment 3, the distribution where a demagnetization rate is high is narrowed similarly to those of Embodiments 1 and 2. FIG. 20 shows a result for comparing an induced voltage of the embodiment in which an induced voltage of a case of "L1>L2" being the related art technology is normalized at 1. In addition, FIG. 21 shows a diagram for comparing an induced-voltage reduction rate of the embodiment in which an induced-voltage reduction rate of the case of "L1>L2" being the related art technology is normalized at 1.

As shown in FIG. 20, it can be understood that, by utilizing the embodiment, the induced voltage is enhanced. In addition, as shown in FIG. 21, it can be understood that, as for the induced-voltage reduction rate, the reduction rate is decreased. This means that there arises an effect of eliminating a magnet's recessed portion in the vicinity of the middle of magnet, and so, this is because of the increase in a fundamental wave of gap's magnetic flux density through magnets for contributing to the torque produced between the stator 10 and the rotor 20. For this reason, it is made possible to increase the torque in low speed ranges, and also it becomes possible to curb the reduction of magnet's magnetic flux due to irreversible demagnetization caused by magnet's demagnetizing at a time of high temperatures. That is to say, it becomes possible to suppress torque reduction under high temperatures.

FIG. 22 is a partially enlarged view in Modification Embodiment 1 of the permanent magnet synchronous motor according to Embodiment 3, which differs from FIG. 18 in the following points.

FIG. 22 differs in a point in which the permanent magnet 22 sandwiched between two of protrusion 242a and protrusion 242b does not extend up to the rotor core 21, but extends partway. As for the reasons to implement Modification Embodiment, in a case in which a circumferential width of a portion sandwiched between the protrusion 242a and the protrusion 242b is narrow, there exists a possibility of causing cracking of a magnet(s) and/or chipping thereof, and other than that, there exists another possibility in which the magnet(s) cannot be manufactured. For this reason, when a production possibility is taken into consideration, it is more desirable to take on a structure in which the bottom face of the permanent magnet 22 is positioned on outer periphery side of a rotor core than an outer circumferential side of the permanent magnet. Also in the configuration, it is possible to obtain similar effects to those of Embodiment 3 shown in FIG. 18.

In addition, as illustrated in FIG. 23, Modification Embodiment 2 is also conceivable in which a rotor core sandwiched between the protrusion 242a and the protrusion 242b is positioned on its outer periphery side. Also in Modification Embodiment 2, it becomes possible to similarly obtain the effect of Embodiment 3.

FIG. 24 through FIG. 26 are partially enlarged views in Modification Embodiment 3 of the permanent magnet synchronous motor according to Embodiment 3, Modification Embodiment 4 thereof and Modification Embodiment 5 thereof, respectively; and, in each of the shapes, the protrusions and the recessed portions are each made mirror-symmetrical by defining the circumferential middle of the permanent magnet 22 as a base axis. It should be noted that the shape structure by means of mirror symmetry in such protrusions and recessed portions is also similar to those in Embodiment 1, Embodiment 2 and the like, and in other embodiments; and thus, by defining the radial line RL in each of the embodiments as a base axis, the mirror symmetry is achieved.

In addition, in Modification Embodiment 3 of FIG. 24 and Modification Embodiment 4 of FIG. 25, the shapes of portions forming the shortest distances L2 are each made in circular arc shapes at recessed portions in their shapes at outmost parts thereof; and moreover, in Modification Embodiment 5 of FIG. 26, the shapes of portions forming the shortest distances L2 are formed tilted or oblique at the recessed portions. Also in these Modification Embodiments, those effects of Embodiment 3 are similarly obtainable.

Embodiment 4

The explanation will be made for permanent magnet synchronous motors according to Embodiment 4. FIG. 27 is a cross-sectional view showing a configuration of a rotor portion in a permanent magnet synchronous motor according to Embodiment 4 in which the rotor is vertically cut across at the rotor portion in an axial direction of its shaft. The basic configuration is similar to those in Embodiments 1 through 3 each, but is different from those in points as follows.

In the embodiment, slits 26 are provided in the rotor core 21 of the rotor as shown in FIG. 27. By placing the slits 26, it becomes possible to reduce q-axis inductance Lq in the permanent magnet synchronous motor. Therefore, it becomes possible to lower the term "ω Lq Iq" stated in Expressions (1) through (4) described above, which results in the reduction of the d-axis voltage Vd and the reduction of the terminal voltage Vt. Namely, the mitigation of voltage saturation is lead to, so that it becomes possible to enhance speed-torque characteristics.

The slits 26 are similarly placed also in FIG. 28 and FIG. 29. Note that, FIG. 27 corresponds to the configuration of FIG. 2; FIG. 28 corresponds to the configuration of FIG. 9; and FIG. 29 corresponds to the configuration of FIG. 18.

In FIG. 27 through FIG. 29 each, the slit placement is an example. The slits are not limited to those; and so, it is only necessary that the slits are placed so that magneto-resistance or magnetic reluctance increases with respect to q-axis magnetic flux Φq in the permanent magnet synchronous motor. In addition, in FIG. 27 through FIG. 29, the slits are placed in the number of two per one pole; however, there would not be a problem caused when the slits are placed in the number of more than that.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "10" designates a stator; "11," stator core; "12," core back; "14," coil; "20," rotor; "21," rotor core; "22," permanent magnet; "23," shaft; "24," "241a," "241b," "241c," "242a," "242b," protrusion; and "25," "251a," "251b," "251c," "252a," "252b," recessed portion.

What is claimed is:

1. A permanent magnet synchronous motor comprising a stator and a rotor placed with the stator by way of a gap therebetween, the permanent magnet synchronous motor comprising:
   the rotor includes a rotor core made of a magnetic material, and a plurality of permanent magnets is placed on a surface of the rotor core where a shape of the permanent magnet whose shape of a face opposes to the stator is made in a circular arc shape;
   the rotor core includes one or more protrusions radially projecting toward a stator core of the stator, and the permanent magnet includes a recessed portion with which the protrusion is fitted in; and
   when a shortest distance between outmost part of the recessed portion of the permanent magnet and an outer periphery's circular arc portion of the permanent magnet is defined as parameter L1, and
   when a shortest distance between the recessed portion and the outer periphery's circular arc portion is defined as parameter L2 where the shortest distance L2 passes through an intersection point at which a tangential line of outmost part on the recessed portion intersects with a parallel line, which defines as its start point a point from which a changeover to the recessed portion of the permanent magnet occurs from an adhesion surface between the permanent magnet and the rotor core, and which is in parallel with a radial line extending from a center of a shaft of the rotor toward a center of the permanent magnet,
   the permanent magnet includes the recessed portion that satisfies L1≤L2, wherein
   the rotor core includes a plurality of protrusions per one pole, and includes a protrusion aggregate set forming the plurality of protrusions as one group of protrusions, and wherein
   recessed portions are formed, on a circumferentially outer side of the protrusion aggregate set, so that a shortest distance L2 between the recessed portions on a circumferentially outer side and an outer periphery's circular arc portion of the permanent magnet satisfies L1≤L2.

2. The permanent magnet synchronous motor as set forth in claim 1, wherein at least one face of the recessed portion and that of the protrusion are in contact with each other.

3. The permanent magnet synchronous motor as set forth in claim 2, wherein the rotor is provided with a slit therein so that magnetic reluctance increases with respect to q-axis magnetic flux Φq in the permanent magnet synchronous motor.

4. The permanent magnet synchronous motor as set forth in claim 1, wherein a shape of a portion forming a shortest distance L2 in a shape of outmost part of the recessed portion is made in a circular arc shape at the recessed portion.

5. The permanent magnet synchronous motor as set forth in claim 4, wherein the rotor is provided with a slit therein so that magnetic reluctance increases with respect to q-axis magnetic flux Φq in the permanent magnet synchronous motor.

6. The permanent magnet synchronous motor as set forth in claim 1, wherein a shape of a portion forming the shortest distance L2 is formed oblique at the recessed portion.

7. The permanent magnet synchronous motor as set forth in claim 6, wherein the rotor is provided with a slit therein so that magnetic reluctance increases with respect to q-axis magnetic flux Φq in the permanent magnet synchronous motor.

8. The permanent magnet synchronous motor as set forth in claim 1, wherein a number of the recessed portions is an odd number of three or more.

9. The permanent magnet synchronous motor as set forth in claim 8, wherein a number of the protrusions is an odd number of three or more.

10. The permanent magnet synchronous motor as set forth in claim 8, wherein the plurality of recessed portions and the plurality of protrusions are each mirror-symmetrical by defining a circumferential middle of the permanent magnet as a base axis.

11. The permanent magnet synchronous motor as set forth in claim 1, wherein a number of the recessed portions is an even number of two or more.

12. The permanent magnet synchronous motor as set forth in claim 11, wherein a number of the protrusions is an even number of two or more.

13. The permanent magnet synchronous motor as set forth in claim 1, wherein the rotor is provided with a slit therein so that magnetic reluctance increases with respect to q-axis magnetic flux Φq in the permanent magnet synchronous motor.

* * * * *